(12) United States Patent
Sorrentino et al.

(10) Patent No.: US 10,104,714 B2
(45) Date of Patent: Oct. 16, 2018

(54) METHOD AND APPARATUS FOR TIMING MISALIGNMENT SIGNALLING

(71) Applicant: Telefonaktiebolaget L M Ericsson (publ), Stockholm (SE)

(72) Inventors: Stefano Sorrentino, Solna (SE); Gino Luca Masini, Stockholm (SE); Stefan Wänstedt, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 496 days.

(21) Appl. No.: 14/400,092

(22) PCT Filed: Aug. 8, 2014

(86) PCT No.: PCT/SE2014/050924
§ 371 (c)(1),
(2) Date: Nov. 10, 2014

(87) PCT Pub. No.: WO2015/020603
PCT Pub. Date: Feb. 12, 2015

(65) Prior Publication Data
US 2016/0262204 A1    Sep. 8, 2016

Related U.S. Application Data

(60) Provisional application No. 61/864,372, filed on Aug. 9, 2013.

(51) Int. Cl.
*H04W 84/18* (2009.01)
*H04W 76/14* (2018.01)
*H04W 56/00* (2009.01)

(52) U.S. Cl.
CPC ....... *H04W 84/18* (2013.01); *H04W 56/0015* (2013.01); *H04W 76/14* (2018.02)

(58) Field of Classification Search
CPC ..... H04W 72/04; H04W 76/00; H04W 88/08; H04W 88/00; H04W 84/00; H04W 84/18; H04W 76/14; H04W 56/0015; H04L 7/00
(Continued)

(56) References Cited

U.S. PATENT DOCUMENTS

| 6,112,100 A | 8/2000 | Ossoinig et al. |
| 8,391,131 B2 * | 3/2013 | Baldemair .......... H04J 13/0003 370/208 |

(Continued)

FOREIGN PATENT DOCUMENTS

| CN | 102037752 A | 4/2011 |
| CN | 102265699 A | 11/2011 |

(Continued)

OTHER PUBLICATIONS

Chen, Tao, et al., "Time Hopping for Device-to-Device Communication in LTE Cellular System." IEEE WCNC 2010 proceedings. 2010. IEEE, Piscataway, NJ.

(Continued)

*Primary Examiner* — Phong La
(74) *Attorney, Agent, or Firm* — Coats & Bennett, PLLC

(57) ABSTRACT

A wireless communication system (10) comprises multiple groups (12) of wireless communication devices (14). The devices (14) within any given group (12) are synchronized to the same timing reference and devices (14) in different groups (12) are not synchronized to the same timing reference. A device (14) transmits direct control signaling to other devices (14) according to the timing reference of its group (12). A method in the system (10) is implemented by a radio node (16) associated with one of the groups (12). The method includes generating (110) a message that indicates, for each of one or more of the groups (12), a range of possible values for misalignment between the timing refer- (Continued)

ence of that group (12) and a common timing reference. This range accounts for uncertainty in that misalignment. The method also entails transmitting (120) the message from the radio node (16).

27 Claims, 7 Drawing Sheets

(58) Field of Classification Search
USPC .......................................................... 370/329
See application file for complete search history.

(56) References Cited

U.S. PATENT DOCUMENTS

| | | | |
|---|---|---|---|
| 8,744,471 B1 | 6/2014 | Cai et al. | |
| 2003/0147362 A1* | 8/2003 | Dick | H04B 7/2687 370/324 |
| 2004/0043797 A1 | 3/2004 | Shostak | |
| 2005/0075125 A1* | 4/2005 | Bada | H04W 48/20 455/525 |
| 2006/0120379 A1* | 6/2006 | Beshai | H04L 47/60 370/395.4 |
| 2006/0120397 A1* | 6/2006 | Kreiner | H04W 88/04 370/437 |
| 2006/0239333 A1* | 10/2006 | Albert | H04W 72/0406 375/130 |
| 2007/0005926 A1 | 1/2007 | Kim | |
| 2007/0153834 A1 | 7/2007 | Qu et al. | |
| 2008/0101281 A1 | 5/2008 | Harris et al. | |
| 2008/0144493 A1* | 6/2008 | Yeh | H04W 52/50 370/230 |
| 2008/0181127 A1 | 7/2008 | Terry et al. | |
| 2009/0103465 A1* | 4/2009 | Chow | H04W 72/005 370/312 |
| 2009/0103501 A1* | 4/2009 | Farrag | H04W 74/02 370/337 |
| 2009/0285119 A1 | 11/2009 | Horn et al. | |
| 2009/0310561 A1 | 12/2009 | Grob et al. | |
| 2010/0009675 A1 | 1/2010 | Wijting | |
| 2010/0165882 A1 | 7/2010 | Palanki et al. | |
| 2010/0317305 A1* | 12/2010 | Sahlin | H04L 25/0224 455/181.1 |
| 2011/0258313 A1 | 10/2011 | Mallik et al. | |
| 2011/0268006 A1 | 11/2011 | Koskela et al. | |
| 2012/0120849 A1 | 5/2012 | Kazmi et al. | |
| 2012/0178485 A1* | 7/2012 | Zeira | H04W 4/08 455/515 |
| 2012/0236977 A1* | 9/2012 | Zou | H04W 56/0015 375/354 |
| 2012/0258706 A1* | 10/2012 | Yu | H04W 56/0045 455/426.1 |
| 2012/0258752 A1* | 10/2012 | Liao | H04W 56/00 455/509 |
| 2012/0306693 A1* | 12/2012 | Edge | H04W 64/003 342/357.29 |
| 2013/0022010 A1 | 1/2013 | Oianxi et al. | |
| 2013/0040673 A1* | 2/2013 | Siomina | G01S 5/0226 455/501 |
| 2013/0083675 A1 | 4/2013 | Yamada | |
| 2013/0148566 A1 | 6/2013 | Doppler et al. | |
| 2013/0150051 A1 | 6/2013 | Van Phan et al. | |
| 2013/0157656 A1 | 6/2013 | Gao et al. | |
| 2013/0188473 A1 | 7/2013 | Dinan | |
| 2014/0022986 A1* | 1/2014 | Wu | H04W 48/16 370/328 |
| 2014/0105192 A1 | 4/2014 | Park et al. | |
| 2014/0162545 A1* | 6/2014 | Edge | H04W 8/005 455/3.01 |
| 2014/0204898 A1 | 7/2014 | Yang et al. | |
| 2014/0269642 A1* | 9/2014 | Forenza | H04J 11/003 370/337 |
| 2014/0286215 A1 | 9/2014 | Koc et al. | |
| 2015/0181583 A1 | 6/2015 | Siomina et al. | |
| 2015/0215883 A1 | 7/2015 | Zheng et al. | |
| 2015/0289282 A1* | 10/2015 | Phuyal | H04W 56/00 370/329 |
| 2016/0014589 A1 | 1/2016 | Niu et al. | |
| 2016/0028572 A1* | 1/2016 | Suzuki | H04W 16/14 370/281 |

FOREIGN PATENT DOCUMENTS

| | | |
|---|---|---|
| CN | 102972050 A | 3/2013 |
| EP | 2211581 A1 | 7/2010 |
| RU | 2011100785 A | 7/2012 |
| WO | 2011130630 A1 | 10/2011 |
| WO | 2011147462 A1 | 12/2011 |
| WO | 2013005972 A2 | 1/2013 |
| WO | 2013074015 A1 | 5/2013 |
| WO | 2013078901 A1 | 6/2013 |
| WO | 2014168573 A2 | 10/2014 |
| WO | 2015020602 A1 | 2/2015 |

OTHER PUBLICATIONS

3rd Generation Partnership Project, "3rd Generation Partnership Project; Technical Specification Group Services and System Aspects; Feasibility study for Proximity Services (ProSe) (Release 12)", Technical Report, 3GPP TR 22.803 V12.2.0, Jun. 1, 2013, pp. 1-45, 3GPP, France.

3rd Generation Partnership Project, "3rd Generation Partnership Project; Technical Specification Group Radio Access Network; Evolved Universal Terrestrial Radio Access Network (E-UTRAN); X2 application protocol (X2AP) (Release 11)", Technical Specification, 3GPP TS 36.423 V11.5.0, Jun. 1, 2013, pp. 1-144, 3GPP, France.

* cited by examiner

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 .. <maxCellineNB> | | | EACH | ignore |
| >>Cell ID | M | | ECGI 9.2.14 | Id of the source cell | – | – |
| >>UL Interference Overload Indication | O | | 9.2.17 | | – | – |
| >>Sync Reference | O | | BOOLEAN | Indicates that this cell is the reference with respect to which all other signaled *Sync Delta Range* IEs are measured | – | – |
| >>Sync Delta Range | O | | | | – | – |
| >>UL High Interference Information | | 0 .. <maxCellineNB> | | | – | – |
| >>>Target Cell ID | M | | ECGI 9.2.14 | Id of the cell for which the HII is meant | – | – |
| >>>UL High Interference Indication | M | | 9.2.18 | | – | – |
| >>Relative Narrowband Tx Power (RNTP) | O | | 9.2.19 | | – | – |
| >>ABS Information | O | | 9.2.54 | | YES | ignore |
| >>Invoke Indication | O | | 9.2.55 | | YES | ignore |
| >Neighbour Cell Information Item | | 0 .. <maxNeighCells> | | | EACH | ignore |
| >>Cell ID | M | | ECGI 9.2.14 | Id of the neighbour cell | – | – |
| >>Sync Reference | O | | BOOLEAN | Indicates that this cell is the reference with respect to which all other signaled *Sync Delta Range* IEs are measured | – | – |
| >>Sync Delta Range | O | | | | – | – |

| Range bound | Explanation |
|---|---|
| maxCellineNB | Maximum no. cells that can be served by an eNB. Value is 256. |
| maxNeighCells | Maximum no. of neighbour cells served by neighbour eNBs. Value is 256. |

FIG. 4A

| IE/Group Name | Presence | Range | IE type and reference | Semantics description | Criticality | Assigned Criticality |
|---|---|---|---|---|---|---|
| Sync Delta Min | M | | INTEGER (-50..50) | milliseconds | – | – |
| Sync Delta Max | M | | INTEGER (-50..50) | milliseconds | – | – |

FIG. 4B

| IE/Group Name | Presence | Range | IE type and reference | Semantics description | Criticality | Assigned Criticality |
|---|---|---|---|---|---|---|
| Message Type | M | | 9.2.13 | | YES | Ignore |
| Cell Information | M | | | | YES | Ignore |
| >Cell Information Item | | 1 .. <maxCellineNB> | | | EACH | Ignore |
| >>Cell ID | M | | ECGI 9.2.14 | Id of the source cell | – | – |
| >>Sync Reference | O | | BOOLEAN | Indicates that this cell is the reference with respect to which all other signaled *Sync Delta Range* IEs are measured | – | – |
| >>Sync Delta Range | O | | | | – | – |
| >Neighbour Cell Information Item | | 1 .. <maxNeighCells> | | | EACH | Ignore |
| >>Cell ID | M | | ECGI 9.2.14 | Id of the neighbour cell | – | – |
| >>Sync Reference | O | | BOOLEAN | Indicates that this cell is the reference with respect to which all other signaled *Sync Delta Range* IEs are measured | – | – |
| >>Sync Delta Range | O | | | | – | – |

| Range bound | Explanation |
|---|---|
| maxCellineNB | Maximum no. cells that can be served by an eNB. Value is 256. |
| maxNeighCells | Maximum no. of neighbour cells served by neighbour eNBs. Value is 256. |

FIG. 5

METHOD AND APPARATUS FOR TIMING MISALIGNMENT SIGNALLING

RELATED APPLICATIONS

The present application claims benefit of U.S. Provisional Application 61/864,372, filed 9 Aug. 2013, the disclosure of which is incorporated herein by reference in its entirety.

TECHNICAL FIELD

The present application relates generally to method and apparatus in a wireless communication system, and specifically to method and apparatus for timing misalignment signaling in such a system.

BACKGROUND

Device-to-device (D2D) communication is a well-known and widely used component of many existing wireless technologies, including ad hoc and cellular networks. Examples of device-to device communication include Bluetooth and several variants of the IEEE 802.11 standards suite such as WiFi Direct. These systems operate in unlicensed spectrum.

Device-to-device communications as an underlay to cellular networks have been proposed as a means to take advantage of the proximity of communicating devices and at the same time to allow devices to operate in a controlled interference environment. Typically, it is suggested that such device-to-device communication shares the same spectrum as the cellular system, for example by reserving some of the cellular uplink resources for device-to-device purposes. Allocating dedicated spectrum for device-to-device purposes is a less likely alternative as spectrum is a scarce resource. Moreover, (dynamic) sharing between the device-to-device services and cellular services is more flexible and provides higher spectrum efficiency.

Devices that want to communicate, or even just discover each other, typically need to transmit various forms of control signaling directly between one another. Control signaling transmitted directly between devices (i.e., as device-to-device communication) is referred to herein as direct control signaling. One example of such direct control signaling is the so-called discovery signal (also known as a beacon signal). A discovery signal at least carries some form of identity and is transmitted by a device that wants to be discoverable by other devices. Other devices can scan for the discovery signal. Once the other devices have detected the discovery signal, they can take the appropriate action. For example, the other devices can try to initiate a connection setup with the device transmitting the discovery signal.

When multiple devices transmit direct control signaling (discovery signals or any other type of direct control signaling), the transmissions from the different devices may be time synchronized (mutually time-aligned) or unsynchronized. Synchronization could be obtained for example by receiving appropriate signals from an overlaid cellular network, or from a global navigation satellite system such as a global positioning system (GPS). Discovery signals transmitted by a device within a cell for instance are typically synchronized to a cell-specific reference signal transmitted by the cell. Even in unsynchronized deployments, it may be beneficial for different cells to synchronize to each other, maintaining a time resolution up to that obtainable from the backhaul. If the network time protocol (NTP) is the source of synchronization, typical synchronization drifts are in the order of +/−5 ms.

Unsynchronization could occur where discovery signals are transmitted between unsynchronized cells, carriers and/or public land mobile networks (PLMNs). According to ProSe requirements, wireless communication devices belonging to one cell need to be able to discover wireless communication devices camping on another cell. Additionally, the proximity wireless communication devices may camp on different PLMNs or different carriers. Where different cells, carriers, or PLMNs are unsynchronized, from a device-to-device communication perspective, there are no cell boundaries.

The ProSe Study Item recommends supporting device-to-device communication for out-of-network coverage wireless communication devices. In such case, different synchronization options are possible: wireless communication devices may synchronize to a global reference (e.g., GPS) which is in general different from the synchronization reference of deployed networks. Alternatively, wireless communication devices may operate in a fully asynchronous fashion (no synchronization reference). A further option is that clusters of wireless communication devices synchronize to a specific wireless communication device, such as a Cluster Head (CH). This CH provides local synchronization to its neighbor wireless communication devices. Different clusters are not necessarily synchronized.

Wireless communication devices may discover unsynchronized discovery signals on a given carrier (or subband) by searching for discovery signals in time over their configured/predefined resources. This can be done, e.g., by time domain correlation of the received signal with the discovery signal waveforms. This is similar to the way wireless communication devices search for cells in a long-term evolution (LTE) standard for wireless communication. LTE uses a primary synchronization signal (PSS) and a secondary synchronization signal (SSS).

Wireless communication devices may alternate between an awake state and a sleep state (i.e., discontinuous reception (DRX)). During a sleep state, the memory and clocks are active, but the wireless communication device is configured to not monitor for any direct control signaling. During an awake state (or wake up time), the device is configured to indeed monitor for direct control signaling. Not monitoring for direct control signaling during the sleep state reduces the device's power consumption.

SUMMARY

One or more embodiments herein recognize that unsynchronized direct control signaling between wireless communication devices threatens those devices with excessive power consumption. Indeed, the unsynchronized nature of the direct control signaling suggests that a device must monitor for direct control signaling from another device (i.e., remain in an awake state) over a long period of time in order to ensure that any such signaling is detected with acceptable latency. One or more embodiments herein, however, advantageously arm the device with information that enables the device to monitor for unsynchronized direct control signaling without having to remain in an awake state for such a long period of time.

In particular, one or more embodiments herein include a method in a wireless communication system that comprises multiple groups (e.g., cells or clusters) of wireless communication devices. The devices within any given group are synchronized to the same timing reference, at least within a predefined margin of error. By contrast, devices in different groups are not synchronized to the same timing reference, meaning that the timing references of those groups may be misaligned. A radio node associated with one of the groups generates a message that indicates, for each of one or more of the groups, a range of possible values for misalignment between the timing reference of that group and a common timing reference (e.g., a timing reference of a certain one of the groups). This range accounts for uncertainty in that misalignment. The radio node then transmits this generated message.

In some embodiment, for instance, the radio node transmits the message to one or more devices in its associated group. In other embodiments, the radio node transmits the message to a radio node associated with another group, e.g., for propagation of the indicated range(s) by the other radio node to devices within that other group. In any case, the radio node does so in some embodiments in order to ultimately assist devices to narrowly tailor the timing of their direct control message monitoring to the timing of potential inter-group direct control message reception.

In one or more embodiments, the method further includes determining the range of possible values for misalignment between the timing reference of a given group and the common timing reference. In one embodiment, for example, this determination is based on a margin of error allowed for devices in the given group to be considered as synchronized to the same timing reference. Additionally or alternatively, the determination is based on inherent propagation delay between the given group's associated radio node and the devices in that given group. As yet another alternative or addition, the determination is based on inherent propagation delay between devices in different groups. At least a portion of the range of possible values for misalignment may be determined based on a communication protocol employed for communication in and/or between the different groups.

In some embodiments, the message indicates the range of possible values for misalignment between the timing reference of a given group and the common timing reference, by indicating the maximum one of those possible values.

In one or more embodiments, the message indicates different ranges of possible values for misalignment between the timing reference of a group and the common timing reference. These different ranges are associated with different resources configured for transmitting direct control signaling between devices.

In some embodiments, the groups correspond to different clusters of devices. Each cluster has a cluster head that is a device belonging to the cluster and that assigns resources on which the devices in the cluster are to transmit direct control signaling to other devices. In this case, the radio node associated with one of the groups is a cluster head for one of the clusters.

In other embodiments, the wireless communication system comprises a cellular communication system. The system includes radio network nodes that provide radio coverage for devices in respective cells. In this case, the groups may correspond to different cells in the system. The radio node associated with one of the groups is therefore a radio network node providing radio coverage for devices in one of the cells.

In any event, the message according to some embodiments also indicates whether and/or to what extent one or more neighboring cells are causing interference to a cell provided by the radio node. Where the system is an LTE system, for instance, the message may be an X2AP LOAD INFORMATION message.

In some embodiments, the message indicates the range for each of one or more groups in a SYNC DELTA RANGE information element (IE).

Embodiments herein further include corresponding apparatus, computer programs, carriers, and computer program products.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 4A illustrates an X2AP Load Information message according to one or more embodiments herein.

FIG. 4B illustrates minimum and maximum values of a sync delta range in the X2AP Load Information message of FIG. 4A, according to some embodiments.

FIG. 5 illustrates a dedicated message for use in the method of FIG. 3 according to one or more embodiments.

DETAILED DESCRIPTION

Figure 1:
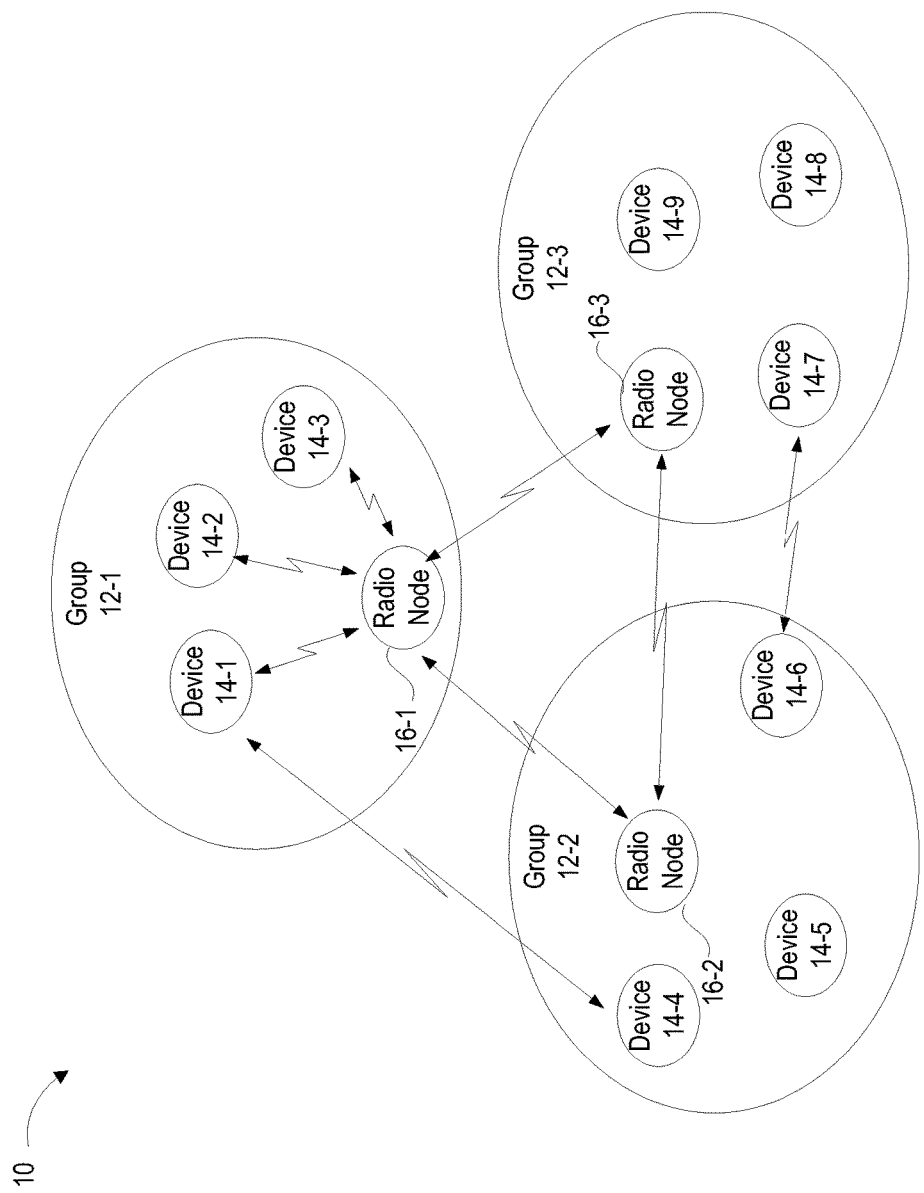
FIG. 1 is a block diagram of a wireless communication system according to one or more embodiments that includes multiple groups of wireless communication devices.

FIG. 1 shows a wireless communication system 10 comprising multiple groups 12 of wireless communication devices 14. More specifically, FIG. 1 illustrates as an example one group 12-1 of three devices 14-1 through 14-3, another group 12-2 of three devices 14-4 through 14-6, and yet another group 12-3 of three devices 14-7 through 14-9. The devices 14 within any given group 12 are synchronized to the same timing reference, at least within a predefined "acceptable" margin of error. Synchronized in this way, the devices 14 within any given group 12 time their transmission and reception according to this same timing reference. Devices 14 in different groups 12, by contrast, are not synchronized to the same timing reference, meaning that the timing references of different groups 12 (and thereby the transmission and reception timing of different groups 12) are at risk of being misaligned.

A radio node 16 is associated with each group 12. As shown, for instance, radio node 16-1 is associated with group 12-1, radio node 16-2 is associated with group 12-2, and radio node 16-3 is associated with group 12-3. A radio node 16 as used herein is configured to transmit and receive radio signals, and to control one or more devices 12 within its associated group 12 in some capacity (e.g., by controlling the timing reference used by the group 12).

In some embodiments, for example, the different groups 12 correspond to different cells in a cellular communication system. In this case, the radio nodes 16 in FIG. 1 are radio network nodes (e.g., base stations) that provide radio coverage for the devices 12 in their respective cells. This case is therefore also appropriately referred to herein as a network (NW) coverage case, where the devices 14 are within the coverage of a wireless communication network and communicate with the network via the radio network nodes providing radio coverage for respective cells.

Figure 2:
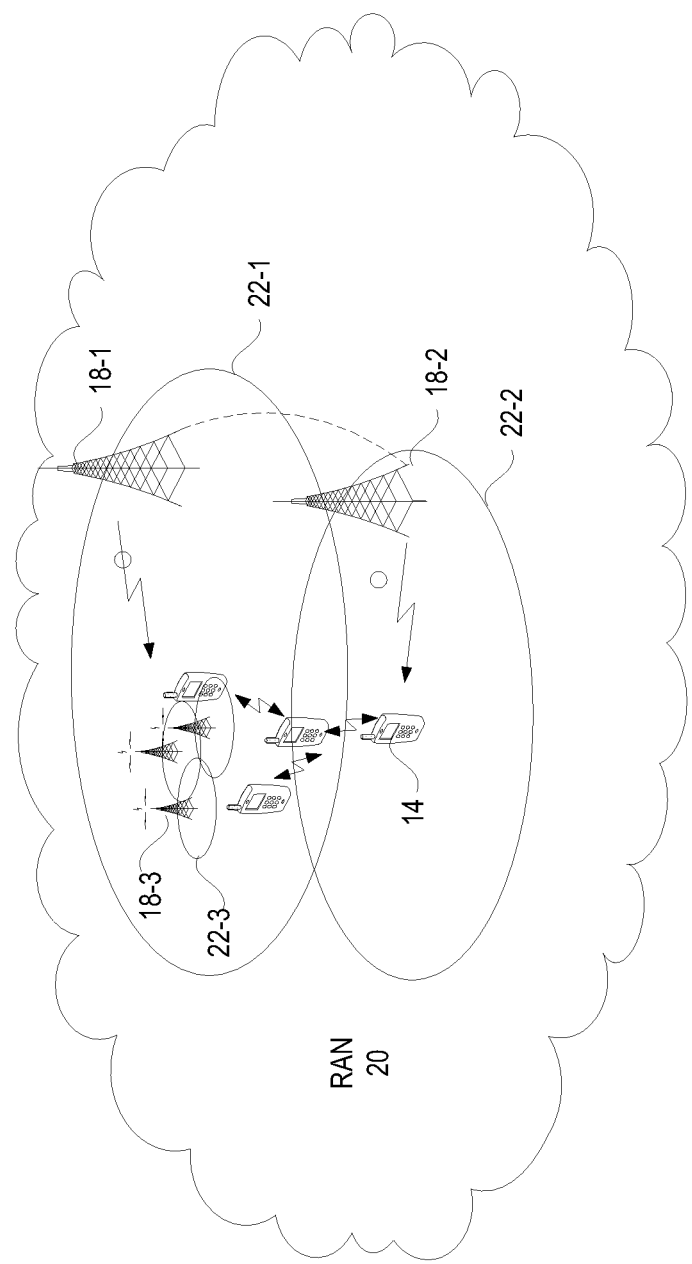
FIG. 2 is a block diagram of a radio access network that includes multiple cells corresponding to the groups in FIG. 1, according to one or more embodiments.

FIG. 2 broadly illustrates this network coverage case by illustrating wireless communication devices 14 being within the radio coverage of radio network nodes 18 (e.g., base stations) in a radio access network 20. The cells 22 provided by these radio network nodes 18 correspond to the groups 12 in FIG. 1, and may correspond to different cells 22 of the same public land mobile network (PLMN), different carrier, or different PLMN. Devices 14 located in the same cell 22 (camping on the same cell 22) are synchronized to the same timing reference and typically derive that synchronization from the downlink in that cell 22. This ensures that transmissions from different devices 14 are time synchronized and, consequently, reception at a given device 14 is roughly synchronized. The timing difference is proportional to the distance and could be absorbed by the cyclic prefix in orthogonal frequency-division multiplexing (OFDM) for instance. In any event, the network coverage case assumes in some embodiments that devices 14 at issue are sufficiently close to one another in order to communicate directly with one another, e.g., via device-to-device communication, irrespective of whether the devices 14 are served by different radio network nodes 18. Such assumption often proves true, for instance, in heterogeneous networks that employ macro radio network nodes as well as pico, micro, etc. radio network nodes.

In other embodiments, the different groups 12 in FIG. 1 correspond to different clusters of devices 14 that are synchronized to the same timing reference. This may be the case for instance where devices 14 are either not configured to communicate with any wireless communication network (or are simply not within the coverage of such a network), but the devices 14 within any given cluster are nonetheless within communication range of each other for device-to-device communication. In this case, which is also appropriately referred to herein as the lack of network coverage case, the radio nodes 16 in FIG. 1 are so-called cluster heads. A cluster head as used herein is a wireless communication device 14 that not only belongs to a group 12 of devices 14, but also controls the devices 14 in that group 12 in some capacity; that is, the cluster head acts as the head of a cluster of devices 14 that are synchronized to the same timing reference. The cluster head in some embodiments for instance has special control authority to assign the resources on which devices 14 in the cluster are to transmit. That is, rather than the devices 14 themselves autonomously deciding on which resources to transmit (e.g., possibly within a subset of preconfigured resources, such as a certain subband), the cluster head makes such decision on behalf of the cluster as a whole. The cluster head alternatively or additionally controls the devices 14 in a group 12 by controlling the timing reference used by that group 12.

Figure 3:
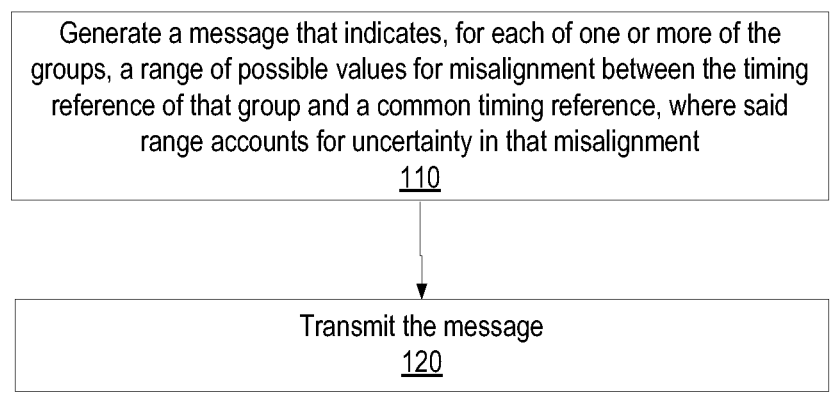
FIG. 3 is a logic flow diagram of a method performed by a radio node according to one or more embodiments.

Irrespective of whether the groups 12 in FIG. 1 constitute cells or clusters, a radio node 16 associated with one of the groups 12 (e.g., group 12-1) is configured to implement the method 100 shown in FIG. 3. Specifically, the radio node 16 is configured to generate a message that indicates, for each of one or more of the groups 12, a range of possible values for misalignment between the timing reference of that group 12 and a common timing reference, where this range accounts for uncertainty in that misalignment (Block 110). In some embodiments, the common timing reference is the timing reference of a certain group 12, meaning that the message directly indicates the range of possible misalignment between different groups' timing references. In other embodiments, the common timing reference is an absolute timing reference (e.g., a global or universal timing reference divorced from any group 12). In this case, the message still indicates the range of possible misalignment between different groups' timing references, but the message indicates this only indirectly via the absolute timing reference or in conjunction with other information. In either case, therefore, the message provides information effective for determining a range of possible timing misalignment between different groups 12, accounting for uncertainty in that misalignment.

Regardless of the particular way that the radio node 16 generates this message, the radio node 16 is further configured to transmit the message (Block 120). In some embodiments, for example, the radio node 16 transmits the message to one or more devices 14 in the group 12 with which the radio node 16 is associated, so as to inform those devices 14 of the one or more misalignment ranges indicated by the message. Where the radio node 16 implementing the method of FIG. 3 is radio node 16-1 in FIG. 1, for instance, radio node 16-1 transmits the message to one or more of the devices 14-1, 14-2, and 14-3 in group 12-1, e.g., by broadcasting the message over a broadcast channel. Radio node 16-1 does so in some embodiments to directly or indirectly indicate to the devices 14 in group 12-1 the range of possible values for misalignment between group 12-1's timing reference and the timing reference of group 12-2 and/or 12-3.

Additionally or alternatively in other embodiments, the radio node 16 transmits the message to a radio node 16 associated with another group 12. Again, where the radio node 16 implementing the method of FIG. 3 is radio node 16-1 in FIG. 1, radio node 16-1 transmits the message to radio node 16-2 and/or radio node 16-3. Radio node 16-1 does so in some embodiments with the expectation that the one or more indicated ranges are to be relayed by radio node 16-2 and/or radio node 16-3 to one or more devices 14 within group 12-2 and/or group 12-3.

In any event, the radio node 16 transmits the message in some embodiments in order to ultimately assist a device 14 in the system 10 to monitor for inter-group direct control signaling. Direct control signaling in this regard refers to control signaling transmitted directly between devices 14, i.e., as device-to-device (D2D) communication that does not involve any intermediate nodes. One example of such direct control signaling is a so-called discovery signal (also known as a beacon signal) that a device 14 transmits in order to be discovered by other devices 14 in proximity. Any embodiments herein focusing on such discovery signals are equally applicable to other types of direct control signaling unless indicated otherwise. In at least some embodiments, a radio node 16 for a group 12 configures resources for transmission of direct control signaling, such as discovery signals, according to a periodic, regular, sparse in time, or otherwise predefined pattern. The time (and possibly frequency) resources for direct control signaling transmission/reception in any given group 12 are defined with respect to the timing reference of that group 12. With devices 14 in any given group timing their transmission and reception according to the same timing reference, direct control signaling between those devices 14 is synchronized in nature. By contrast, since devices 14 in different groups 12 time their transmission and reception according to different timing references, direct control signaling between devices 14 in different groups 12 is unsynchronized in nature.

In the interest of power efficiency, any given wireless communication device 14 operates in either an awake state or a sleep state according to an awake-sleep state cycle (e.g., DRX cycle). In the awake state, a device 14 monitors for direct control signaling from other devices 14, such as by turning on one or more receivers. In a sleep state, by contrast, a device 14 does not monitor for such direct control signaling, such as by turning off one or more receivers. Correspondingly, a device 14 conserves more power when operating in a sleep state than when operating in an awake state. The unsynchronized nature of inter-group direct control signaling, however, threatens a device's ability to conserve power in this way.

One or more embodiments herein however enable a device 14 to monitor for inter-group direct control signaling in a power-efficient manner despite the unsynchronized nature of such signaling. In this regard, a device 14 nominally transmits and monitors for direct control signaling according to the timing reference of its group 12. This would otherwise suggest that the device 14 must monitor for inter-group direct control signaling over a long period of time (since the device 14 otherwise has no information about when to expect that inter-group control signaling due to its unsynchronized nature). One or more embodiments herein however arm the device 14 with the one or more misalignment ranges indicated by the message in FIG. 3 (which effectively describes the unsynchronized nature of the direct control signaling, accounting for any uncertainty in that unsynchronized natures). The device 14 exploits those one or more ranges in order to estimate the potential timing of inter-group direct control signaling reception. The device 14 then more narrowly tailors the timing of its direct control signaling monitoring (e.g., DRX cycle) to that potential timing of reception. For example, the device 14 in some embodiments adjusts the intervals of time that it monitors for direct control signaling to narrowly encompass the intervals of time during which inter-group direct control signaling is expected to be received, as determined based on the range(s) signaled. This effectively conserves device power while still ensuring acceptable latency in detecting inter-group direct control signaling.

Irrespective of this ultimate effect, FIG. 3's message in some embodiments indicates a range of possible values for misalignment between the timing reference of a given group 12 and a common timing reference, by indicating the maximum one of those possible values. That is, the range is indicated in terms of the maximum possible timing misalignment (e.g., with a minimum possible timing misalignment being known or predefined). Where the groups 12 correspond to cells 22, for instance, the timing range may describe the maximum timing misalignment between cells 22 in proximity. No matter the particular implementation, though, the message indicates this timing misalignment range, as opposed to a single timing alignment offset, in order to account for one or more sources of uncertainty in the misalignment.

Accordingly, the radio node 16 implementing the method of FIG. 3 itself determines the timing misalignment range based on these one or more sources of uncertainty. In particular, the radio node 16 determines the range of possible values for misalignment between the timing reference of a given group 12 and the common timing reference based on one or more sources of uncertainty.

In some embodiments, one such source of uncertainty originates from the margin of error allowed for devices 14 in the same group 12 to be considered as synchronized to the same timing reference. Indeed, this margin of error effectively allows a range of possible values for misalignment between the actual timing references used by devices 14 in the same group 12. The timing misalignment range indicated by the message encompasses and otherwise accounts for this margin of error.

Alternatively or additionally, another source of uncertainty originates from inherent propagation delay between a group's radio node 16 (e.g., base station or cluster head) and the devices 14 in that group 12. Indeed, this propagation delay affects a device's perception of the group's timing reference to an unknown extent.

As yet another example, another source of uncertainty originates from inherent propagation delay between devices 14 in different groups 12. This unknown propagation delay affects a device's perception of the extent of misalignment between the groups' timing references.

The sources of uncertainty accounted for by the message are of course not limited to the above examples. That is, in general, one or more embodiments herein envision that the one or more ranges of misalignment indicated by the message account for any or all sources of such uncertainty, including those not explicitly outlined by the above examples.

Moreover, the radio node 16 in some embodiments determines the portion of the range of misalignment attributable to any given source of uncertainty based on one or more parameters associated with communication in and/or between the groups 12 at issue (e.g., the communication protocol employed).

Where the groups 12 correspond to cells 22, for instance, the message in at least some embodiments includes an indication of the synchronization error/inaccuracy between the serving cell and other cells in proximity, whose devices 14 are transmitting direct control signaling of interest. An example of such signaling is a timing range describing the maximum timing misalignment between cells in proximity. The width of such time window ("direct control window") depends on the synchronization margin and/or synchronization accuracy between cells and it can be in the order of +/− some milliseconds.

Note that, in one or more embodiments, there may be different ranges of possible values for misalignment between the timing reference of a group and the common timing reference. These different ranges may for instance be associated with different resources configured for transmitting direct control signaling between devices.

Embodiments herein also do not limit the message to any particular format and do not limit the message to being dedicated to the above purpose. In one embodiment where the message is transmitted from a first radio network node 18-1 to a second radio network node 18-2, for example, the message also indicates whether and/or to what degree the second radio network node 18-2 is potentially causing (uplink) interference at the first radio network node 18-1. In LTE embodiments described more fully below, for instance, such a message comprises an X2AP LOAD INFORMATION message.

More specifically, in certain embodiments, the range is transmitted in a message that indicates an identity of the serving cell and indicates whether and/or to what extent one or more neighboring cells are causing interference to the serving cell. An example of such a message is the X2AP Load Information message, as described in the below embodiments.

An example of the X2AP Load Information message occurs when the base station 18 is an evolved NodeB (eNodeB or eNB) in LTE. An eNB is a mandatory node in a RAN where the Long-Term Evolution (LTE) is the standard for the wireless communication. The eNB is a complex base station that handles radio communications with multiple devices in the cell and carries out radio resource management and handover decisions. The eNB communicates directly with mobile handsets (UEs), like a base transceiver station (BTS) with a GSM network, or a network with a Global System for Mobile Communications (GSM) standard.

The eNBs exchange information about their synchronization accuracy as well as the resources for discovery. Each eNB derives the discovery window for resources associated with neighbor cells' wireless communication devices 14 and signals such information according to embodiments herein. The eNBs are aware of their range of misalignment or synchronization error by exchanging information over, e.g., an X2 interface (typically set up between pairs of eNBs deployed in the same area). For example, the eNBs transmit to each other packets including a time-stamp according to a local clock and they reply to such time stamps with a reported time difference.

The eNBs typically exchange Almost Blank Subframe (ABS) information over X2 through the X2AP LOAD INFORMATION message. The eNBs inflicting severe interference onto others are periodically muted for entire subframes. The victim eNBs have a chance to serve their wireless communication devices 14 suffering from severe interference from the eNB in these subframes. This muting is not complete, as certain signals have to be transmitted even in otherwise muted subframes (e.g., to avoid radio link failure or for reasons of backwards compatibility). Subframes thus muted are referred to as almost blank subframes (ABS).

In some embodiments, the same message exchanged about ABS information is extended to also convey the range of possible values for misalignment, i.e., synchronization difference information. The range or synchronization difference information, as described above, is either "absolute" for all signaled cells or "relative" to one of the cells.

FIG. 4A shows a representation of an X2AP Load Information message modified to include an indication of the above-described range, i.e., a synchronization difference. Referring to FIG. 4A, where a synchronization difference is absolute, a Sync Delta Range IE is signaled in each Cell Information Item IE. Where a synchronization difference is relative, a Sync Delta Range IE is signaled in all Cell Information Item IEs except for one reference cell, identified by a specific IE. Those skilled in the art will appreciate that the Sync Reference IE could also be encoded as an ENUMERATED type instead of a BOOLEAN, to enable future extensions of this functionality. Additionally, a sync delta range in some embodiments is defined by a minimum and maximum as shown in FIG. 4B.

The sending eNB is configured in some embodiments (e.g., via OAM) to signal information to the receiving eNB not only about its served cells, but also about its neighbor cells. One example of this, showing information about both served cells and neighbor cells, is shown in FIG. 4A. For the case of "relative" synchronization difference, the reference cell need not be one of the served cells, but it could also be one of the neighbor cells.

The receiving eNB performs the appropriate error handling in case the Sync Reference IE is present for more than one signaled cell.

In certain embodiments, generating the message comprises adding message components to an X2AP Load Information message, as shown in FIG. 4A. In other words, adding additional fields or extending the X2AP Load Information message.

As shown in FIG. 4A, the X2AP Load Information message contains a Cell Information Item field which has a Cell ID component and a Uplink (UL) Interference Overload Indication. The UL Interference Overload Indication is triggered when high-interference in the uplink direction is detected by an eNB. The overload indication will be sent to neighbor eNBs whose wireless communication devices 14 are potentially the source of this high interference. The message contains a low, medium or high interference level indication.

The message components added in some embodiments include a timing reference or a sync reference and an indication of the range of possible values for misalignment. In this embodiment, the indication of the range is relative to the sync reference and indicates the misalignment between two unsynchronized cells.

In other embodiments, a message is defined as being dedicated to the purpose of signaling the indication of the range. In one embodiment, therefore, transmitting the range message comprises transmitting over an X2 interface a message dedicated to indicating a range of possible values for misalignment.

FIG. 5 shows an example of a dedicated message or synchronization message. In this embodiment, the same information is signaled as shown in FIG. 4A with the same logic and node behavior, but a new, dedicated Class 2 X2AP procedure is introduced. A dedicated message has the advantage of not requiring changes to handle a new use case as with the X2AP Load Information message. The Sync Delta Range IE in FIG. 5 is the same as defined in FIG. 4A.

Figure 6:
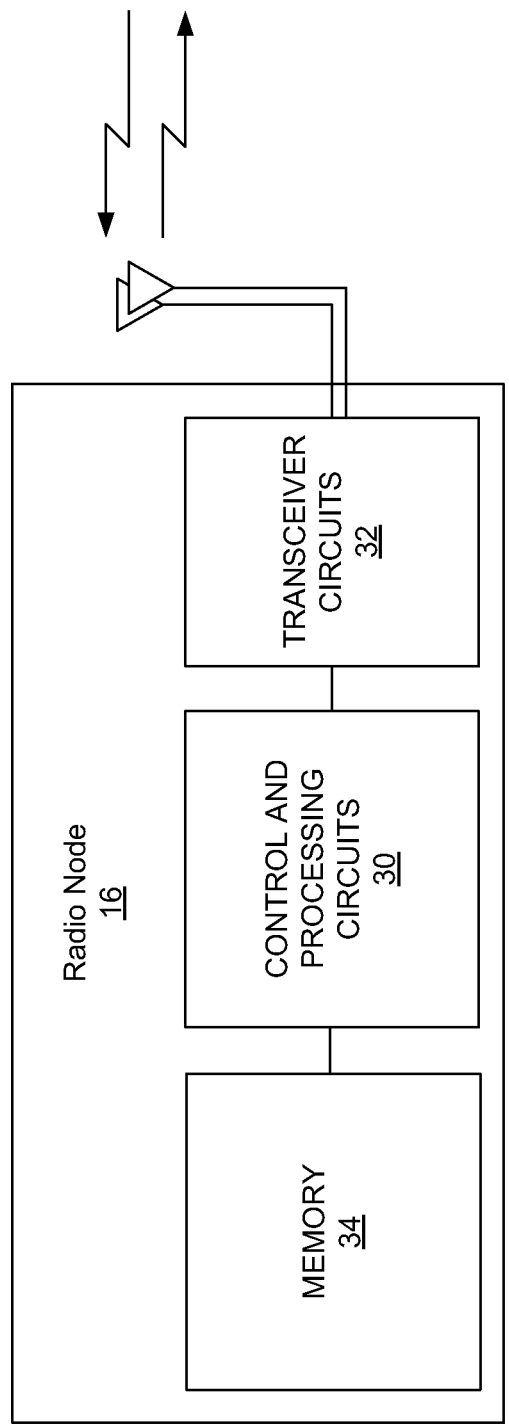
FIG. 6 is a block diagram of a radio node according to one or more embodiments.

In view of the above modifications and variations, FIG. 6 shows an example embodiment of a radio node 16. The radio node 16 comprises one or more processing circuits 30 configured to perform the method in FIG. 3. The radio node 16 also includes one or more radio transceiver circuits 32 configured to both transmit and receive radio signals. The one or more radio transceiver circuits 32, for example, includes various radio-frequency components (not shown) to receive and process radio signals from one or more wireless communication devices 14, via one or more antennas, using known signal processing techniques. In embodiments where the radio node 16 comprises a radio network node 118, the radio node 16 also includes one or more network communication interfaces (e.g., an X2 interface) configured to communicate with one or more other radio network nodes.

The radio node 16 in some embodiments further comprises one or more memories 34 for storing software to be executed by, for example, the one or more processing circuits 30. The software comprises instructions to enable the one or more processing circuits 30 to perform the method as shown in FIG. 3. The memory 34 may be a hard disk, a magnetic storage medium, a portable computer diskette or disc, flash memory, random access memory (RAM) or the like. Furthermore, the memory 34 may be an internal register memory of a processor.

Of course, not all of the steps of the techniques described herein are necessarily performed in a single microprocessor or even in a single module. Thus, a more generalized control circuit configured to carry out the operations described above may have a physical configuration corresponding directly to the processing circuit(s) 30 or may be embodied in two or more modules or units. The radio node 16 may for instance include different functional units, each configured to carry out a particular step of FIG. 3.

Those skilled in the art will also appreciate that embodiments herein further include a corresponding computer program. The computer program comprises instructions which, when executed on at least one processor of a radio node 16, cause the radio node 16 to carry out any of the processing described above. Embodiments further include a carrier containing such a computer program. This carrier may comprise one of an electronic signal, optical signal, radio signal, or computer readable storage medium. Those skilled in the art will appreciate that such a computer program according to some embodiments comprises one or more code modules contained in memory 34, each module configured to carry out a particular step of FIG. 4.

Embodiments herein also correspondingly include a wireless communication device 14 configured to receive and process the message described above. Such a device 14 is similarly represented by the structure shown in FIG. 6.

As used herein, the term "wireless communication device" 14 is any device configured to communicate wirelessly with another node and to communicate directly with another such wireless communication device (i.e., via device-to-device communication). A wireless communication device 14 therefore includes a user equipment (UE), a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities, a machine-to-machine device, or the like.

Also as used herein, the term "radio network node" 18 refers to a radio node 16 that is part of a radio access network 20. A radio network node 18, for example, includes an eNB in LTE, a control node controlling one or more remote radio units (RRUs), a radio base station, an access point, or the like. The radio network node 18 in some embodiments is configured to operate over a so-called system bandwidth. A portion of this system bandwidth in some embodiments in reserved, statically or dynamically, for D2D communication. Hence, a DC bandwidth is available for assignment to for example DC messages.

Further, as used herein, a timing reference includes any reference in the time domain that functions as a common source for time-domain synchronization. A timing reference may include for instance the timing of a defined transmission or reception window. In LTE, for example, such includes the timing of an LTE subframe in some embodiments.

Those skilled in the art will also appreciate that the various "circuits" described may refer to a combination of analog and digital circuits, including one or more processors configured with software stored in memory and/or firmware stored in memory that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. Moreover, the above embodiments are able to be implemented independently or in combination with one another. The present embodiments are thus to be considered in all respects as illustrative and not restrictive.

What is claimed is:

1. A method in a wireless communication system that comprises multiple groups of wireless communication devices, wherein the wireless communication devices within any given group are synchronized to a same timing reference, a timing reference of the given group, and the wireless communication devices in different groups are not synchronized to the same timing reference, wherein a wireless communication device in any given one of the multiple groups transmits direct control signaling to other devices according to the timing reference of the given one of the multiple groups, and wherein the method is implemented by a radio node associated with one of the multiple groups and comprises:

generating a message that indicates, for each of one or more of the multiple groups, a range of possible values for a misalignment between the timing reference of the group and a common timing reference, wherein the range accounts for uncertainty in the misalignment; and transmitting the message from the radio node, wherein the message indicates for a first group of the one or more of the multiple groups a first range accounting for uncertainty in a first misalignment between a first timing reference for the first group and the common timing reference, and wherein any wireless communication devices in the first group are synchronized to the first timing reference, and transmit any direct control signaling to other devices according to the first timing reference.

2. The method of claim 1, further comprising determining the range of possible values for misalignment between the timing reference of the group and the common timing reference based on one or more of:

a margin of error allowed for the wireless communication devices in the group to be considered as synchronized to the same timing reference;

inherent propagation delay between the group's associated radio node and the wireless communication devices in the group; and inherent propagation delay between devices in different groups.

3. The method of claim 2, wherein the determining comprises determining a portion of the range of possible values for misalignment between the timing reference of the group and the common timing reference based on a communication protocol employed for communication in or between the different groups.

4. The method of claim 1, wherein the message indicates the range of possible values for misalignment between the timing reference of the group and the common timing reference, by indicating the maximum one of those possible values.

5. The method of claim 1, wherein the common timing reference is the timing reference of a certain one of the multiple groups.

6. The method of claim 1, wherein the transmitting comprises transmitting the message from the radio node to one or more devices in the group with which the radio node is associated.

7. The method of claim 1, wherein the transmitting comprises transmitting the message from the radio node to a radio node associated with another group.

8. The method of claim 1, wherein the message indicates for at least one of the multiple groups different ranges of possible values for misalignment between the timing reference of a respective one of the multiple groups and the common timing reference, wherein the different ranges are associated with different resources configured for transmitting direct control signaling between devices.

9. The method of claim 1, wherein the multiple groups correspond to different clusters of devices, each cluster having a cluster head that is a device belonging to the cluster and that assigns resources on which the devices in the cluster are to transmit direct control signaling to other devices, and wherein the radio node is a respective cluster head for one of the clusters.

10. The method of claim 1, wherein the wireless communication system comprises a cellular communication system, the cellular communication system including radio network nodes that provide radio coverage for devices in respective cells, wherein the multiple groups correspond to different cells in the wireless communication system, and wherein the radio node is a radio network node providing radio coverage for devices in one of the cells.

11. The method of claim 10, wherein the message also indicates whether or to what extent one or more neighboring cells are causing interference to a cell provided by the radio node.

12. The method of claim 11, wherein the wireless communication system is a Long Term Evolution (LTE) system, and wherein the message is an X2AP LOAD INFORMATION message.

13. The method of claim 10, wherein the message indicates the range for each of one or more groups in a SYNC DELTA RANGE information element (IE).

14. A radio node in a wireless communication system that comprises multiple groups of wireless communication devices, wherein the wireless communication devices within any given group are synchronized to a same timing reference, a timing reference of the given group, and the wireless communication devices in different groups are not synchronized to the same timing reference, wherein a wireless communication device in any given one of the multiple groups transmits direct control signaling to other devices according to the timing reference of the given one of the multiple groups, and wherein the radio node is associated with one of the multiple groups and comprises:
  one or more radio transceiver circuits configured to transmit and receive radio signals; and
  one or more processing circuits configured to:
    generate a message that indicates, for each of one or more of the multiple groups, a range of possible values for a misalignment between the timing reference of the group and a common timing reference, wherein the range accounts for uncertainty in the misalignment; and
    transmit the message from the radio node via the one or more radio transceiver circuits, wherein the message indicates for a first group of the one or more of the multiple groups a first range accounting for uncertainty in a first misalignment between a first timing reference for the first group and the common timing reference, and wherein any wireless communication devices in the first group are synchronized to the first timing reference, and transmit any direct control signaling to other devices according to the first timing reference.

15. The radio node of claim 14, wherein the one or more processing circuits are further configured to determine the range of possible values for misalignment between the timing reference of the group and the common timing reference based on one or more of:
  a margin of error allowed for the wireless communication devices in the group to be considered as synchronized to the same timing reference;
  inherent propagation delay between the group's associated radio node and the wireless communication devices in the group; and
  inherent propagation delay between devices in different groups.

16. The radio node of claim 15, wherein the one or more processing circuits are configured to determine a portion of the range of possible values for misalignment between the timing reference of the group and the common timing reference based on a communication protocol employed for communication in or between the different groups.

17. The radio node of claim 14, wherein the message indicates the range of possible values for misalignment between the timing reference of the group and the common timing reference, by indicating the maximum one of those possible values.

18. The radio node of claim 14, wherein the common timing reference is the timing reference of a certain one of the multiple groups.

19. The radio node of claim 14, wherein the one or more processing circuits are configured to transmit the message from the radio node to one or more devices in the group with which the radio node is associated.

20. The radio node of claim 14, wherein the one or more processing circuits are configured to transmit the message from the radio node to a radio node associated with another group.

21. The radio node of claim 14, wherein the message indicates for at least one of the multiple groups different ranges of possible values for misalignment between the timing reference of the group and the common timing reference, wherein the different ranges are associated with different resources configured for transmitting direct control signaling between devices.

22. The radio node of claim 14, wherein the multiple groups correspond to different clusters of devices, each cluster having a cluster head that is a device belonging to the cluster and that assigns resources on which the devices in the cluster are to transmit direct control signaling to other devices, and wherein the radio node is a respective cluster head for one of the clusters.

23. The radio node of claim 14, wherein the wireless communication system comprises a cellular communication system, the cellular communication system including radio network nodes that provide radio coverage for devices in respective cells, wherein the multiple groups correspond to different cells in the wireless communication system, and wherein the radio node is a radio network node providing radio coverage for devices in one of the cells.

24. The radio node of claim 23, wherein the message also indicates whether or to what extent one or more neighboring cells are causing interference to a cell provided by the radio node.

25. The radio node of claim 24, wherein the wireless communication system is a Long Term Evolution (LTE) system, and wherein the message is an X2AP LOAD INFORMATION message.

26. The radio node of claim 23, wherein the message indicates the range for each of one or more groups in a SYNC DELTA RANGE information element (IE).

27. A computer program product stored on a non-transitory, computer readable storage medium and comprising instructions which, when executed by at least one processor of a radio node in a wireless communication system, causes the radio node to:
  generate a message that indicates, for each of one or more of multiple groups of wireless communication devices, a range of possible values for a misalignment between a timing reference of the group and a common timing reference, wherein the range accounts for uncertainty in the misalignment, wherein the wireless communication devices within any given group are synchronized to a same timing reference, a timing reference of the given group and wireless communication devices in different groups are not synchronized to the same timing reference, and wherein a wireless communication device in any given one of the multiple groups transmits direct control signaling to other devices according to the timing reference of the given one of the multiple groups; and
  transmit the message from the radio node, wherein the message indicates for a first group of the one or more of the multiple groups a first range accounting for uncertainty in a first misalignment between a first timing reference for the first group and the common timing reference, and wherein any wireless communication devices in the first group are synchronized to the first timing reference, and transmit any direct control signaling to other devices according to the first timing reference.

* * * * *